US008126182B2

(12) United States Patent
Chang

(10) Patent No.: US 8,126,182 B2
(45) Date of Patent: Feb. 28, 2012

(54) SOUND EFFECT SYSTEM AND WIRELESS AUDIO OUTPUT DEVICE

(75) Inventor: Yung-Chang Chang, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 1441 days.

(21) Appl. No.: 11/655,107

(22) Filed: Jan. 19, 2007

(65) Prior Publication Data

US 2008/0175419 A1 Jul. 24, 2008

(51) Int. Cl.
*H04R 1/02* (2006.01)
*H04R 5/02* (2006.01)
*H04H 20/47* (2008.01)
*H04M 1/00* (2006.01)

(52) U.S. Cl. ......... 381/334; 381/2; 381/311; 455/556.1; 455/569.1

(58) Field of Classification Search .................. 381/334, 381/2, 311, 306, 333; 700/94; 455/556.1, 455/569.1

See application file for complete search history.

(56) References Cited

U.S. PATENT DOCUMENTS 6,798,654 B2 9/2004 Chang et al.
2008/0132293 A1* 6/2008 Gundlach et al. .......... 455/569.1
2008/0153543 A1* 6/2008 Newman et al. ........... 455/556.1

FOREIGN PATENT DOCUMENTS

CN 1305272 A 7/2001

* cited by examiner

*Primary Examiner* — Devona Faulk

(57) ABSTRACT

This invention discloses a sound effect system and a wireless audio output device. An audio is produced by the sound effect system which is applied in a portable electronic apparatus, and a trough is disposed in the portable electronic apparatus. The system comprises a plurality of audio output devices and at least one wireless audio output device wherein the audio output devices disposed to the portable electronic apparatus are used to receive an audio signal of the portable electrical apparatus to output the audio. The wireless audio output device can be taken out from the trough when the portable electronic apparatus is in use and, a wireless communication protocol is used to receive a wireless audio signal sent from the portable electronic apparatus. When the wireless audio output device is not in use, the device can be contained into the trough to electrically connect the portable electrical apparatus. The power of the device can be recharged by the portable electronic apparatus.

12 Claims, 5 Drawing Sheets

SOUND EFFECT SYSTEM AND WIRELESS AUDIO OUTPUT DEVICE

BACKGROUND OF THE INVENTION

1. Field of the Invention

The present invention relates to a sound effect system and a wireless audio output device, and more particularly to a wireless audio output device that can be contained in a portable electronic apparatus, and the portable electronic apparatus can provide a multi-channel sound effect.

2. Description of the Related Art

Referring to FIG. 1 for a schematic view of an embodiment of a conventional sound effect system of a portable computer, a speaker 11 of the sound effect system is installed at the front side of a host 121 of the portable computer 12, and the design of the sound effect system produces an audio through the speaker 11 with a monophonic channel.

Referring to FIG. 2 for a schematic view of another embodiment of a conventional sound effect system of a portable computer, speakers 21 of the sound effect system is installed separately on both left and right sides of a display device 221 of the portable computer 22, and the design of the sound effect system produces an audio separately from both left and right sides of the speakers 21 to generate a stereo sound effect.

In recent years, the portable computer with an enhanced audio/video playback function was developed, and DVD (digital video disc/disk) movies usually have a 5.1 channel surround sound effect that may not be accomplished by the single channel or both left and right channels.

To satisfy the requirement of the aforementioned sound effect, the inventor of the present invention based on years of experience to conduct extensive researches and experiments, and finally invented a sound effect system and a wireless audio output device to meet the 5.1 channel surround sound effects.

SUMMARY OF THE INVENTION

Therefore, it is a primary objective of the present invention to provide a sound effect system and a wireless audio output device; particularly a wireless audio output device that can be contained in a portable electronic apparatus and the portable electronic apparatus can provide a 5.1 channel surround sound effect.

To achieve the foregoing object, a sound effect system of the invention is used in a portable electronic apparatus for producing an audio, and the portable electronic apparatus has at least one trough. The system comprises a plurality of audio output devices and at least one wireless audio output device. The audio output device is installed to the portable electronic apparatus for receiving an audio signal of the portable electronic apparatus to output an audio. The wireless audio output device is taken out from the trough when the wireless audio output device is in use, and a wireless communication protocol is used for receiving a wireless audio signal transmitted from the portable electronic apparatus. If the wireless audio output device is not in use, the wireless audio output device can be stored in the trough and electrically connected to the portable electronic apparatus, so that the portable electronic apparatus can supply power to charge the wireless audio output device.

The wireless audio output device of the invention further comprises a wireless receiver module, an audio output unit, a connector and a power supply module. When the wireless audio output device is in use, the power supply module supplies an operating power to the wireless receiver module and the audio output unit, such that the wireless receiver module can use a wireless communication protocol to receive an external wireless audio signal, and the audio output unit can output an audio based on the external wireless audio signal. If the wireless audio output device is not in use, the connector will be connected to the external power supply interface to receive a power and store the power into the power supply module.

In view of the description above, the sound effect system and the wireless audio output device in accordance with the present invention can satisfy the sound effect requirements and accomplish a multi-channel sound effect for the portable electrical apparatus.

To make it easier for our examiner to understand the technical characteristics and performance of the present invention, we use preferred embodiments with accompanying drawings for the detailed description of the present invention.

DETAILED DESCRIPTION OF THE PREFERRED EMBODIMENTS

In the description of preferred embodiments for a sound effect system and a wireless audio output device in accordance with the present invention, the same numerals are used for the same elements described in different preferred embodiments.

Figure 1:
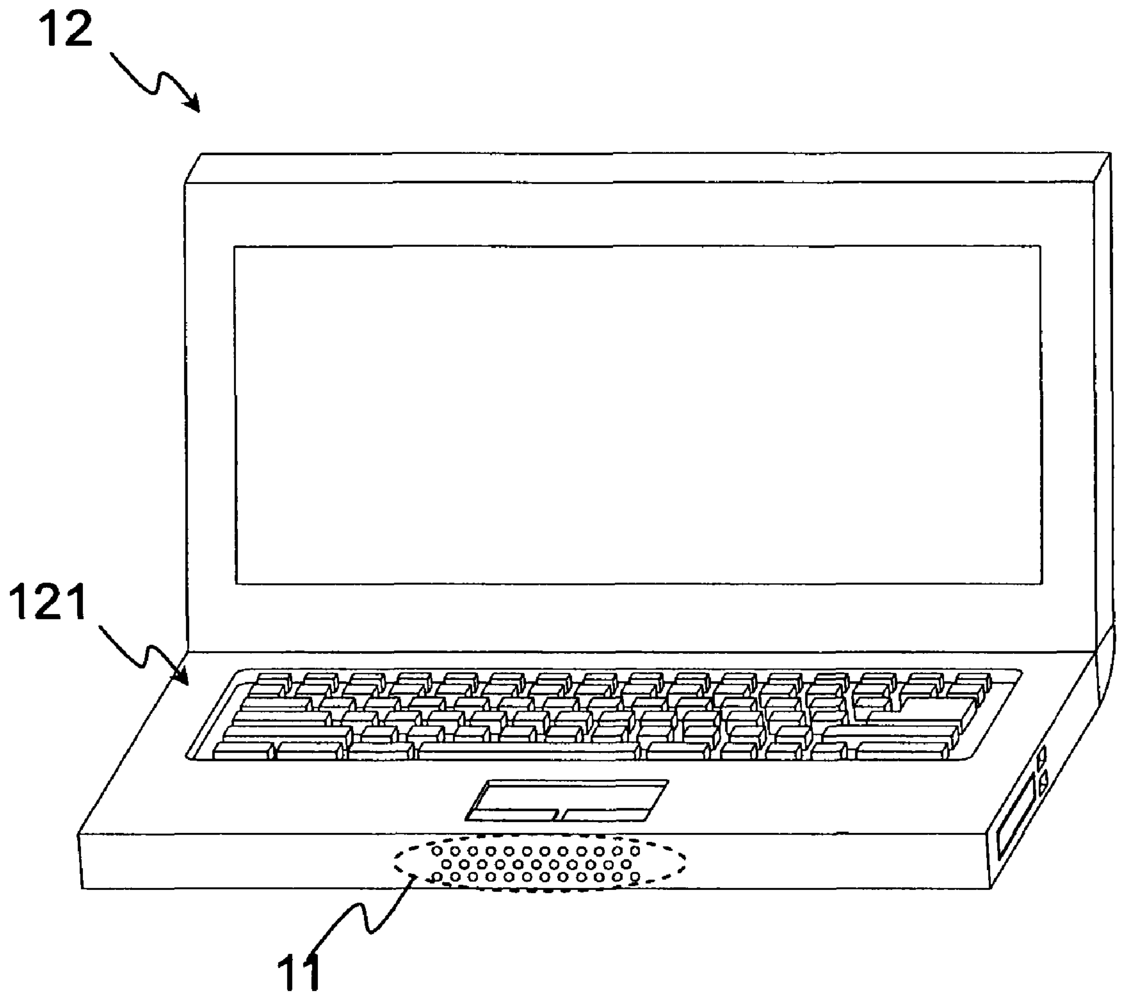
FIG. 1 is a schematic view of an embodiment of a sound effect system of a portable electrical apparatus.
Figure 2:
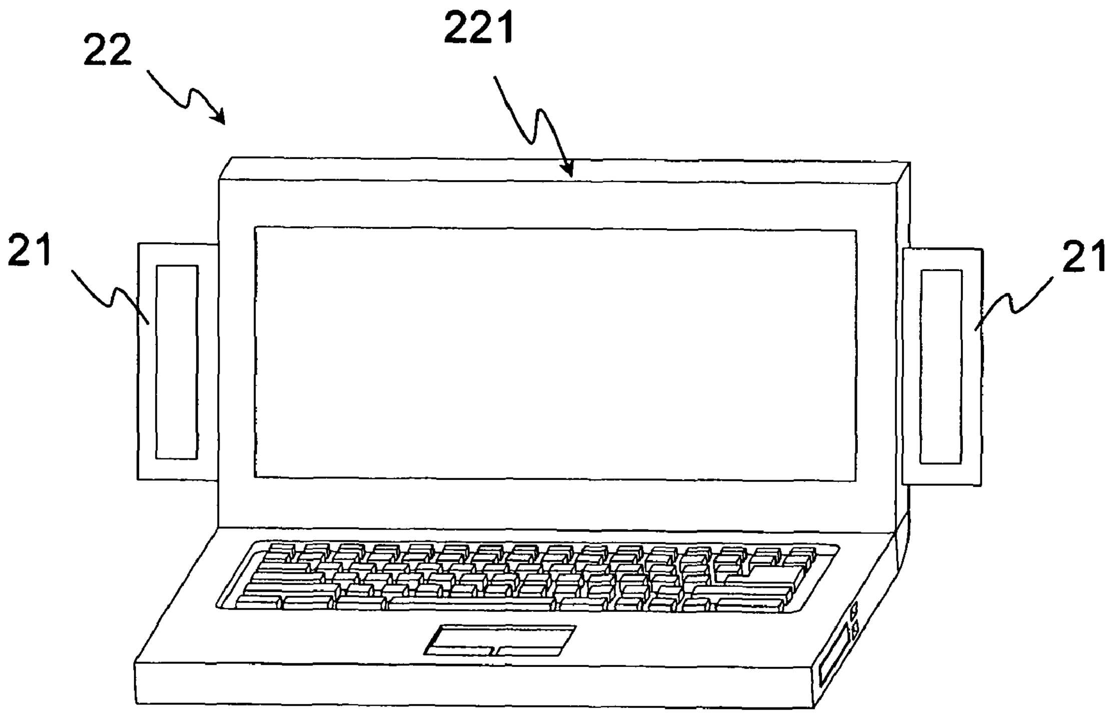
FIG. 2 is a schematic view of another embodiment of a sound effect system of a portable electrical apparatus.
Figure 3:
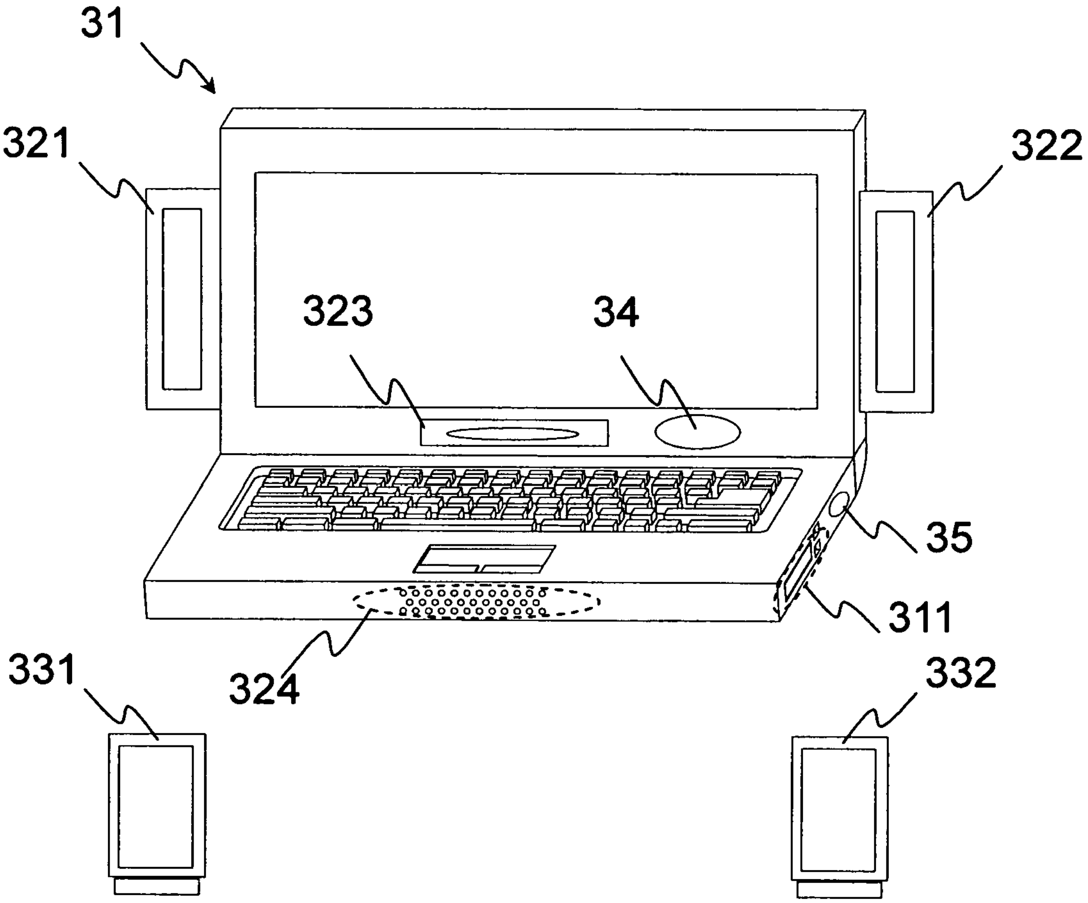
FIG. 3 is a schematic view of a sound effect system of a preferred embodiment of the present invention.

Referring to FIG. 3 for a schematic view of a sound effect system of a preferred embodiment of the present invention, the system is used in a portable electronic apparatus 31 such as a portable computer for producing an audio, and the portable electrical apparatus 31 has at least one trough 311. The system comprises a plurality of audio output devices 321, 322, 323, 324 and at least one wireless audio output device 331, 332, wherein the audio output devices 321, 322, 323, 324 are installed to the portable electronic apparatus 31 for receiving an audio signal of the portable electronic apparatus 31 to output an audio. Meanwhile, the audio output devices 321, 322 are used for outputting the audio from the left and right channels, and the audio output device 323 is used for outputting the audio from the main channel. Further, the audio output device 324 is used exclusively for a low-frequency channel which is also commonly known as a woofer channel, and the audio output device 324 can be installed at a position 34 or a position 35 of the portable electronic apparatus, and the wireless audio output devices 331, 332 are taken out from the trough 311 when they are in use, and a wireless communication protocol is used for receiving a wireless audio signal transmitted from the portable electronic apparatus 31 and outputting an audio through a surround sound channel.

Figure 4:
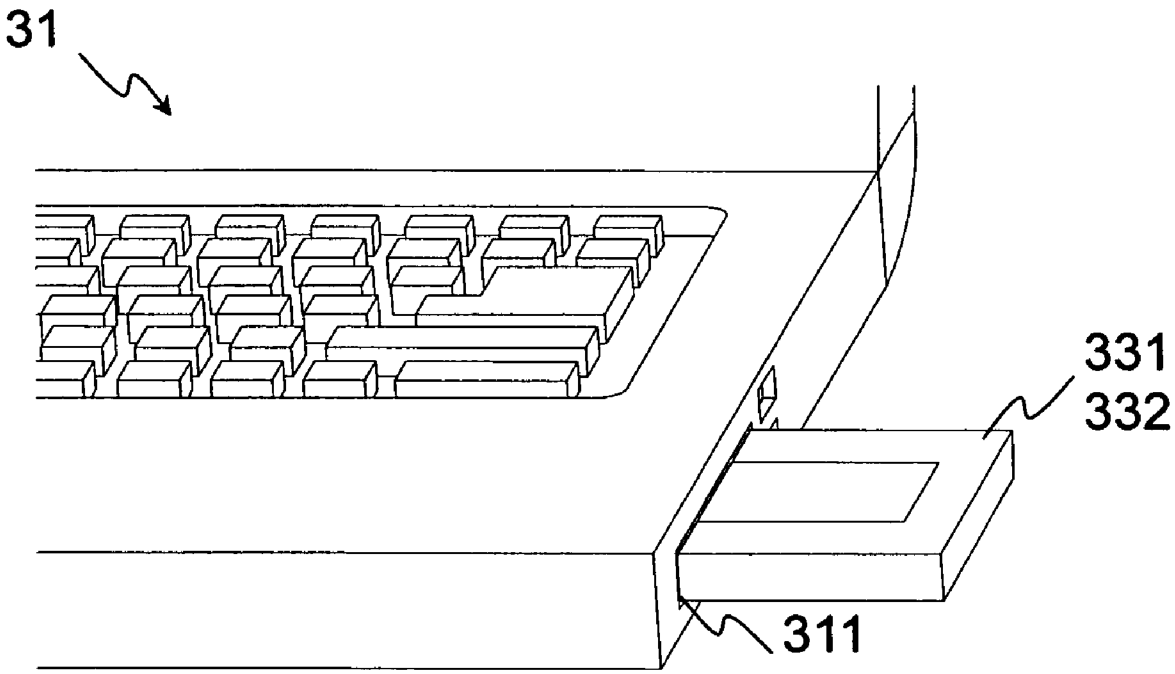
FIG. 4 is a schematic view of a sound effect system of another preferred embodiment of the present invention.

Referring to FIG. 4 for a schematic view of a sound effect system of another preferred embodiment of the present invention, the wireless audio output devices 331, 332 are contained in the trough 311 and electrically connected to the portable electronic apparatus 31 when they are not in use, so that the portable electronic apparatus 31 can supply power for charging the wireless audio output devices 331, 332.

In the sound effect system, the trough has a separate first Personal Computer Memory Card International Association (PCMCIA) connector, and the wireless audio output device has a second PCMCIA connector corresponding to the first connector. After the PCMCIA connectors are connected, the wireless audio output device is electrically connected to the portable electronic apparatus. Furthermore, the audio output device for the outputs from the left and right channels and the main channel and the wireless audio output devices from the surround sound channels are generally speakers, and the audio output device for the output from the low-frequency channel is generally a low-frequency speaker. Meanwhile, the wireless communication protocol is generally a Bluetooth communication protocol or a wireless network communication protocol.

Figure 5:
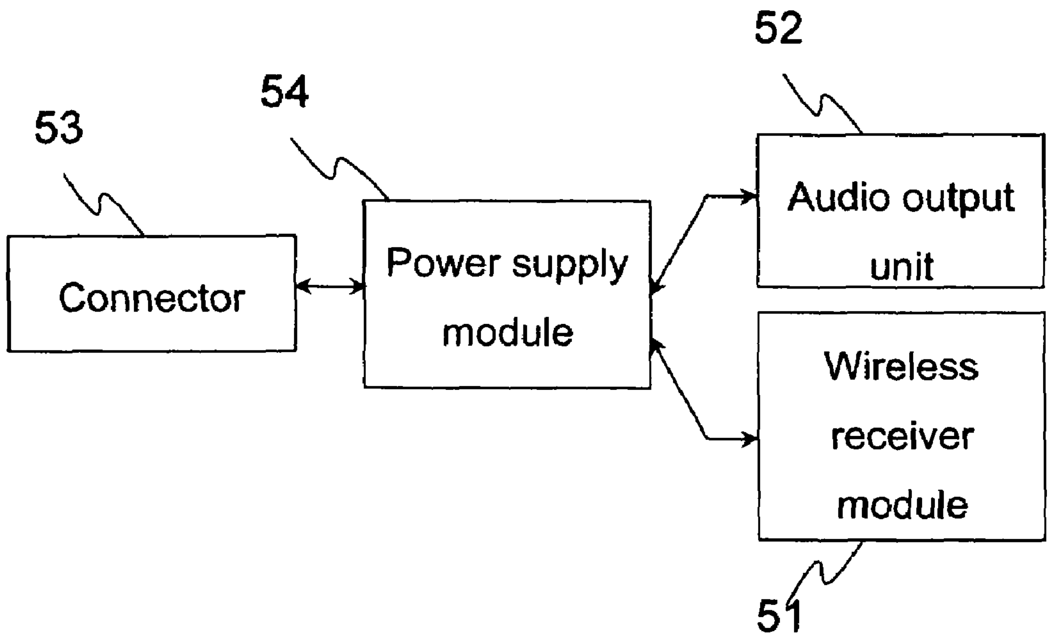
FIG. 5 is a schematic view of a wireless audio output device of the present invention.

Referring to FIG. 5 for a schematic view of a wireless audio output device of the present invention, the device comprises a wireless receiver module 51, an audio output unit 52, a connector 53 and a power supply module 54. The wireless audio output device uses a power supply module 54 to supply an operating power to the wireless receiver module 51 and the audio output unit 52, such that the wireless receiver module 51 can use a wireless communication protocol to receive an external wireless audio signal, and then the audio output unit 52 can output an audio based on the external wireless audio signal. If the wireless audio output device is not in use, the connector 53 will be connected to the external power supply interface for receiving a power and storing the power into the power supply module 54. The wireless receiver module is generally a Bluetooth module or a wireless local area network (WLAN) module, and the audio output unit is generally a thin film speaker, and the connectors are generally PCMCIA connectors.

Figure 6:
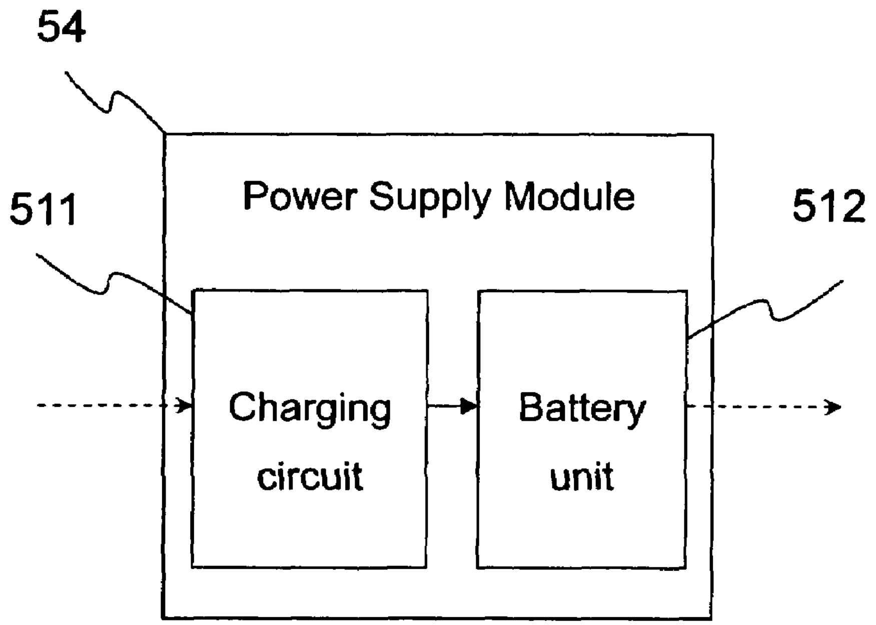
FIG. 6 is a schematic view of a power supply module of a wireless audio output device of the present invention.

Referring to FIG. 6 for a schematic view of a power supply module of a wireless audio output device of the present invention, the power supply module 54 has a charging circuit 511 and a battery unit 512, wherein the charging circuit 511 is connected to a connector for supplying and storing a power to the battery unit 512. If the power supply module 54 is not charged, then the battery unit 512 will supply the operating power to the wireless receiver module 51 and the audio output unit 52.

While the invention has been described by means of specific embodiments, numerous modifications and variations could be made thereto by those skilled in the art without departing from the scope and spirit of the invention set forth in the claims.

What is claimed is:

1. A sound effect system, comprising:

a portable electronic apparatus having at least one trough;

at least two integral audio output devices, installed to said portable electronic apparatus, each configured to receive an audio signal from said portable electronic apparatus; and at least one wireless audio output device stored in said trough, configured to be removable from said trough when in use, and a wireless communication protocol being used for receiving a wireless audio signal transmitted from said portable electronic apparatus, and when said wireless audio output device is stored in said trough said wireless audio output device is electrically connected to said portable electronic apparatus for supplying power to charge said wireless audio output device;

wherein said at least two integral audio output devices and said at least one wireless audio output device are configured to output surround sound audio in conjunction with each other according to said audio signals and wireless audio signal.

2. The sound effect system of claim 1, wherein said portable electronic apparatus is a portable computer.

3. The sound effect system of claim 1, wherein said trough has a first connector.

4. The sound effect system of claim 3, wherein said first connector is a Personal Computer Memory Card International Association (PCMCIA) connector.

5. The sound effect system of claim 1, wherein said integral audio output devices are speakers.

6. The sound effect system of claim 1, wherein said integral audio output devices include at least one low frequency speaker.

7. The sound effect system of claim 1, wherein said wireless audio output device is a speaker.

8. The sound effect system of claim 3, wherein said wireless audio output device has a second connector corresponding to said first connector.

9. The sound effect system of claim 7, wherein said second connector is a Personal Computer Memory Card International Association (PCMCIA) connector.

10. The sound effect system of claim 1, wherein said wireless communication protocol is a Bluetooth communication protocol.

11. The sound effect system of claim 1, wherein said wireless communication protocol is a wireless network communication protocol.

12. The sound effect system of claim 1, comprising three integral audio output devices and two wireless audio output devices, wherein said surround sound audio is outputted in five channels.

* * * * *